United States Patent
Winrow (10) Patent No.: US 10,963,260 B2
(45) Date of Patent: Mar. 30, 2021

(54) BRANCH PREDICTOR

(71) Applicant: Arm Limited, Cambridge (GB)

(72) Inventor: Matthew Lee Winrow, Cambridge (GB)

(73) Assignee: Arm Limited, Cambridge (GB)

(*) Notice: Subject to any disclaimer, the term of this patent is extended or adjusted under 35 U.S.C. 154(b) by 62 days.

(21) Appl. No.: 16/251,539

(22) Filed: Jan. 18, 2019

(65) Prior Publication Data

US 2020/0233672 A1 Jul. 23, 2020

(51) Int. Cl.
*G06F 9/38* (2018.01)
*G06F 9/30* (2018.01)

(52) U.S. Cl.
CPC ........ *G06F 9/3846* (2013.01); *G06F 9/30145* (2013.01); *G06F 9/3844* (2013.01)

(58) Field of Classification Search
None
See application file for complete search history.

(56) References Cited

U.S. PATENT DOCUMENTS

| | | | |
|---|---|---|---|
| 2008/0307209 A1* | 12/2008 | Gschwind | G06F 9/3848 712/239 |
| 2020/0167163 A1* | 5/2020 | Levenstein | G06F 9/3802 |

* cited by examiner

*Primary Examiner* — Cheng Yuan Tseng
(74) *Attorney, Agent, or Firm* — Nixon & Vanderhye P.C.

(57) ABSTRACT

An apparatus comprises processing circuitry to perform data processing in response to instructions; and a branch predictor to predict a branch outcome for a given branch instruction as one of taken and not-taken, based on branch prediction state information indexed based on at least one property of the given branch instruction. In a static branch prediction mode of operation, the branch predictor predicts the branch outcome based on static values of the branch prediction state information set independent of actual branch outcomes of branch instructions which are executed by the processing circuitry while in the static branch prediction mode. The static values of the branch prediction state information are programmable.

17 Claims, 4 Drawing Sheets

BRANCH PREDICTOR

BACKGROUND

Technical Field

The present technique relates to the field of data processing. More particularly, it relates to branch prediction.

Technical Background

A data processing apparatus may have a branch predictor for predicting outcomes of branch instructions before they are actually executed. By predicting branch outcomes before the branch instruction is actually executed, subsequent instructions following the branch can start to be fetched and speculatively executed before execution of the branch instruction is complete. When the prediction is correct then performance is saved because the subsequent instructions can be executed sooner than if they were only fetched, decoded and executed once the outcome of the branch is actually known.

SUMMARY

At least some examples provide an apparatus comprising: processing circuitry to perform data processing in response to instructions; and a branch predictor to predict a branch outcome for a given branch instruction as one of taken and not-taken, based on branch prediction state information indexed based on at least one property of the given branch instruction; in which: in a static branch prediction mode of operation, the branch predictor is configured to predict the branch outcome based on static values of the branch prediction state information set independent of actual branch outcomes of branch instructions which are executed by the processing circuitry while in the static branch prediction mode; and said static values of the branch prediction state information are programmable.

At least some examples provide a branch prediction method for a data processing apparatus comprising: predicting a branch outcome for a given branch instruction as one of taken and not-taken, based on branch prediction state information indexed based on at least one property of the given branch instruction; in which: in a static branch prediction mode of operation, the branch outcome is predicted based on static values of the branch prediction state information set independent of actual branch outcomes of branch instructions which are executed while in the static branch prediction mode; and said static values of the branch prediction state information are programmable.

At least some examples provide an apparatus comprising: processing circuitry to perform data processing in response to instructions; and a branch predictor to predict a branch outcome for a given branch instruction as one of taken and not-taken, based on an opcode-indexed table of branch prediction state information indexed based on at least one property of the given branch instruction, in which: said at least one property comprises information derived from an opcode of the given branch instruction.

Further aspects, features and advantages of the present technique will be apparent from the following description of examples, which is to be read in conjunction with the accompanying drawings.

DESCRIPTION OF EXAMPLES

An apparatus may have processing circuitry for performing data processing in response to instructions, and a branch predictor to predict a branch outcome for a given branch instruction as one of taken and not-taken based on branch prediction state information indexed based on at least one property of the general branch instruction. The taken/not-taken outcome may not be the only property of the branch predicted by the branch predictor. For example the branch predictor could also predict other aspects such as the branch target address of the branch instruction or other properties such as branch type. However, prediction of the taken or not-taken outcome of the branch can be useful for determining whether the next instruction after the branch should be the instruction following on sequentially from the branch (to be executed if the outcome is not-taken) or the instruction at the target address of the branch (to be executed if the outcome is taken).

One approach for branch prediction is to use static branch prediction where some fixed rule is used to determine the prediction for a given branch instruction. A static branch prediction may be a prediction made based on properties of the branch instruction itself and/or pre-determined state, without using any dynamic runtime history or context information about the context in which the branch is executed (e.g. context information derived from previous instructions executed before the branch). For example, a simple scheme for static branch prediction could be that all branches are predicted to be not-taken. Another example of a rule for static branch prediction could be that forward branches, which have a positive address offset for determining the branch target address relative to the address of the branch instruction itself, are predicted as not-taken, while backwards branches which have a negative branch offset are predicted as taken. This rule may exploit the fact that backwards branches are often used in loops where the branch may be taken for a certain number of times until the loop is complete and then not-taken once so it is more likely that backwards branches are taken than not-taken. However, a problem with such static prediction functions is that the rule for static branch prediction is inflexible and applied to all branches, and there may be a significant number of branches which do not follow the behaviour defined by the static branch prediction rule. Therefore the static prediction function may not fit well with many branches and so may provide relatively poor performance.

Hence, in most modern processors, branch predictors use a dynamic branch prediction approach, where the branch prediction is made based on some branch prediction state information which has been trained based on the actual branch outcomes of executed branch instructions. In this way, the branch prediction state information may continually be updated to reflect the behaviour of the branches actually seen by the processing circuitry, to increase the chances that the branch predictor will be able to correctly predict the outcome of a given branch the next time it is seen. Hence, using a dynamic branch prediction mode, where the branch predictor learns from the actual branch outcomes of executed branch instructions, can be useful to improve performance.

However, for some fields of application, it can be important that a given piece of software executes with certain deterministic bounds on its execution latency. For example, in a processor designed for applications which are safety critical, such as controlling a steering or braking system within an automotive vehicle, it can be critical that the behaviour of the code when executing on the processing circuitry is deterministic, so that although the processing may not need to have the highest performance possible, the processing should be guaranteed to complete within certain deterministic limits on latency. Use of dynamic branch prediction can introduce a lot of difficult-to-understand jitter in performance which is non-deterministic due to the variable latency associated with different instances of execution of the same sequence of instructions caused by differences in the branch predictions made for those instructions. If a series of branch instructions are mispredicted by the branch predictor then this could lead to much worse performance than on other occasions when the branches are correctly predicted. Hence, dynamic branch prediction may be less preferred for some fields of application.

In the technique discussed below, the branch predictor has a static branch prediction mode of operation, in which the branch outcome is predicted based on static values of the branch prediction state information which are set independent of actual branch outcomes of branch instructions which are executed by the processing circuitry while in the static branch prediction mode. The static values of the branch prediction state information are programmable. Hence, while in the static branch prediction mode of operation, performance is deterministic because the branch predictions made for a given set of branches will be statically fixed and there is no training of branch prediction state information based on actual outcomes of branch instructions that are executed, nevertheless the static values are programmable so that it is possible to adapt the branch prediction state information for different software workloads so that performance can be improved by configuring the static values of the branch prediction state information for a given software workload to reflect the expected branch behaviour for that workload. Hence, by providing a programmable static branch prediction functionality, this can provide a better balance between performance and determinism than can be provided by either dynamic branch prediction or non-programmable static branch prediction.

The programming of the static values of the branch prediction state information could be performed in different ways. In some examples the programming of the static values of the branch prediction state information could be performed in response to specific instructions executed by the processing circuitry.

For example, the processing circuitry may program at least a subset of the branch prediction state information in response to a branch prediction state programming instruction executed by the processing circuitry. For example the branch prediction state programming instruction could be a system register updating instruction which specifies data to be set to a system register which contains the subset of the branch prediction state information. Another example could be where the branch prediction status programming instruction is a store instruction which specifies as a target address an address mapped to a register storing the at least a subset of the branch prediction state information. In this second example the branch prediction state information may effectively be stored in a memory mapped prediction table. It is not essential for the entire table of the static values of the branch prediction state to be programmed in one instruction. For example, in some cases the branch prediction state information may be stored across a number of registers and separate branch prediction state programming instructions may be required to program each register individually.

The processing circuitry may support execution of the instructions at one of a number of privilege levels. In some examples the processing circuitry could trigger an exception when the branch prediction state program instruction is attempted to be executed at a privilege level which is less privileged than a certain threshold privilege level. For example this can be useful to ensure that only privileged software can update the branch prediction state information. For example, updating of the programmable static branch prediction state information could be restricted to operating system software or software executing at a higher privilege level than the operating system. This can be useful to allow an operating system, when switching between applications, to program in the appropriate set of branch prediction state for that incoming application, so that the set of static branch prediction rules to be used during execution of that application can be targeted more specifically at the expected behaviour of that application than if the same set of branch prediction state was used for all applications.

In some implementations the processing apparatus may have no capability to learn from actual branch execution in order to set the branch prediction state information. For example, there may be no circuitry for updating branch prediction state information in response to the actual branch outcomes. Instead, in such systems the set of programmable values for setting to the static branch prediction state information could be stored in memory or in some preconfigured storage location so that when switching to a given application, the operating system or other software managing that application could read the set of values to be used for the branch predictor from the preconfigured storage location and then write them into the programmable state information to serve as the static values of branch prediction state to use when the system is in the static branch prediction mode. For example the set of branch prediction state values to be used for a given application could be included as literal values within the program code of the application itself, or could have been stored to a given region of memory when the associated program code was installed on a device (e.g. as part of the software image of the associated application).

In cases where the set of static values of branch prediction state information for a given application is fixed in advance, the static values could have been learnt by performing code profiling when developing the software, for example on a remote device used by the developer, rather than being based on learning on the actual processor implementation which is to execute the program code once the device is being used in the field for the desired application such as braking control as discussed above. Hence, the learning of the appropriate set of branch prediction state for a given application state could have been done offline during a development phase rather than being performed on the actual apparatus which has the branch predictor supporting the static branch prediction mode.

However, in another approach, in addition to the static branch prediction mode, the branch predictor could also support a profiling mode of operation, in which the branch predictor may train the branch prediction state information based on actual branch outcomes of branch instructions which are executed while in the profiling mode. Hence during the profiling mode the branch predictor can learn from the actual branch outcomes to train the branch prediction state information so that it is more likely to provide correct predictions when similar instructions are executed again in future. The system could later switch to the static branch prediction mode when the apparatus is actually operational in the field, and at this point the determinism provided by the static branch prediction mode can be beneficial to ensure the device stays within certain safety limits as there is no further training of the branch prediction state information during the static branch prediction mode. Hence, the provision of the profiling mode can allow the device itself to gather the preferred set of branch prediction states for a given task or application.

Switching between the profiling mode and the static branch prediction mode can be controlled in different ways. In some implementations a dedicated mode entry or mode exit instruction can be used to change modes. Alternatively a system register updating instruction which updates a mode indicator within a system register could be used to change mode. Hence, for example the person configuring a given processing device for use in a given safety application could install code on the device, run the code in the profiling mode for an initial period while the device is within the factory to gather the appropriate branch prediction state information for each application, and then switch the mode to the static branch prediction mode before the device is released for use in the field.

In examples where the profiling mode is provided then it can be useful for the branch prediction state information to comprise a set of saturating counters which are indexed based on at least one property of the given branch instruction. By providing saturating counters with a certain number of bits, this can help with the training of the branch prediction state information in the profiling mode, as this may provide some hysteresis so that a single instance of occurrence of one outcome for a given branch instruction or a given branch type does not instantaneously override a previous run of instances of the opposite outcome for the same branch or branch type.

For example, in the profiling mode, in response to determining the actual branch outcome for a resolved branch instruction, the branch predictor may select one of the saturating counters based on the at least one property of the resolved branch instruction, increment the selected saturating counter when the actual branch outcome is one of taken and not-taken, or decrement the selected saturating counter when the actual branch outcome is the other of taken and non-taken. In the static branch prediction mode the branch predictor may then predict the branch outcome based on the comparison between the selected saturating counter and a threshold.

In systems which support the profiling mode, the processing circuitry may also support a branch prediction state extracting instruction which, when executed, triggers the processing circuitry to extract a current value of at least a subset of the branch prediction state information trained during the profiling mode. This can allow the state learned for a given application during the profiling mode to be extracted and then potentially saved to memory so that it can be programmed back into the branch prediction state information at a later time when the corresponding application is executed again. For example the branch prediction state extracting instruction could be a system register read instruction which reads the branch prediction state from a specified system register, or a load instruction which specifies as a target address an address mapped to a register storing the at least a subset of the branch prediction state information. The second example can be useful if a memory mapped structure is used for the branch prediction state information. Regardless of which type of branch prediction state extracting instruction is used, the branch prediction state extracting instruction could either transfer the branch prediction state directly to memory or could transfer the extracted state to a general purpose register from which a subsequent store instruction could then save the extracted branch prediction state to memory so that it can be read again later if necessary.

As for the branch prediction state programming instruction, execution of the branch prediction state extracting instruction could be restricted to privilege levels of a certain threshold privilege level or higher. Hence, execution of the branch prediction state extraction instruction in a state which is less privileged than the threshold privilege level may cause an exception to be signalled.

During the static branch prediction mode the branch prediction state information is indexed based on at least one property of the given branch instruction. Here the term "indexed" refers to the selection of which item of branch prediction state to use for making the prediction for a given branch instruction. Hence, a particular item of branch prediction state is selected based on the at least one property of the given branch instruction. Different properties of a branch could be used to index into the branch prediction state.

In one example the at least one property of the given branch instruction may include information derived from an opcode of the given branch instruction. The opcode is the part of the instruction encoding which identifies the particular type of instruction to be executed. Some systems may support a number of different branch types. For example the different branch instruction types could include:

A branch instruction, for which the outcome of the branch is dependent on condition codes stored in a condition status register but the branch does not itself trigger a comparison between two operands for determining whether the take the branch or not. In some examples, such a conditional branch instruction could be regarded as a single "branch type". In other examples, conditional branch instructions with different test conditions could be regarded as different branch types (the test condition is the condition to be satisfied by the condition codes in order for the branch to be taken). For example, a branch-if-equal (B.EQ) conditional branch instruction may be taken if the condition codes indicate an "equal" condition, while a branch-if-not-equal (B.NE) conditional branch instruction could trigger the branch may be taken if the condition codes indicate a "not equal" condition. Hence, in some examples the B.NE and B.EQ branch instructions may be treated as different branch types. More generally, conditional branch instructions specifying different test conditions could be divided into subsets, with conditional branches specifying a first subset of the test conditions being treated as a different "branch type" to conditional branches specifying a second subset of the test conditions.

A compare and branch instruction which also performs the comparison for determining whether to take the branch.

A compare and branch if zero (CBZ) instruction for which the comparison is by default a comparison between a specified operand and a value of 0.

A branch with link instruction for which, in addition to carrying out a conditional branch operation, if the branch is taken then the address of the next sequential instruction after the branch is written to a link register for serving as a function return address to which execution is directed once processing of the function being branched to is complete.

A branch and change instruction set instruction, which in addition to the conditional branch operation, also triggers a change of instruction set, so that the instructions executed following the branch if the branch is taken are decoded according to a different instruction set from the instruction set being used prior to the branch.

It will be appreciated that these are just some examples of potential branch types which can be distinguished by different opcodes and some systems may also support various combinations of these branch types. The inventor has found that there can be a correlation between the branch opcode and the most likely branch behaviour for a given branch. For example, for some branch opcodes, the branches may normally be taken if the branch offset is positive and not-taken with a negative offset, while for other opcodes the opposite behaviour may be seen. Other opcodes may be normally not-taken regardless of whether their offset is positive or negative. Hence by considering the opcode when indexing into branch prediction state, this can improve performance by allowing different branch prediction behaviour to be selected for the different branch opcode types to match their most likely behaviour. This can be useful to improve performance, but also by considering the opcode as part of the indexing into the branch prediction state, this may allow a simpler branch prediction state table to be maintained than branch prediction tables indexed by branch instruction address as used in many dynamic branch predictors, and even if other properties such as instruction address are not considered, the indexing based on the opcode can still provide a reasonable level of performance for some workloads.

Another property that could be considered could be an indication of whether the given branch instruction is a forward branch (with a positive branch offset) or a backwards branch (with a negative branch offset). For example in one implementation, the branch prediction table could comprise a set of 1-bit indicators or N-bit saturating counters (where N is 2 or more), where the particular bit or counter to use for the prediction is selected based on the combination of at least part of the opcode and an indication of whether the instruction is a forwards branch or backwards branch. This would allow configuration, separately for each opcode, of whether branches of that opcode with positive offsets are predicted taken or not taken, and of whether branches with negative offsets having that opcode are predicted taken or not taken. It has been found that such a static prediction function can for some automotive benchmarks outperform some more complex predictors that may use many more bits of prediction state.

Another aspect of the branch properties that could be used to index into the branch prediction state could be a size of a branch offset for the given branch instruction. For example, an indication of whether the size of the branch offset is greater than or less than a certain threshold could be provided as part of the index.

In some implementations the at least one property of a given branch, which is used as the basis for the index into the branch prediction state information, may be independent of an instruction address to the given branch instruction. A branch prediction state table not indexed by address may be relatively unusual since most dynamic branch predictors would consider the instruction address, and most static branch predictors would not have a branch prediction state table at all as in static branch predictors the same global static prediction rule would be applied to all branches. One would think that ignoring the instruction address of the branch would potentially lead to low performance of branch prediction. However for the safety-critical or real-time applications where determinism is the most important criterion, this may be acceptable and the use of a programmable state table for a static branch prediction mode as discussed above, where the indexing is based on properties other than instruction address, can be sufficient to give a reasonable level of performance with a known latency limit. For example if the table is indexed based on at least the opcode and independent of the instruction address, this has been found to give reasonable performance at a very low cost in terms of the total number of bits of branch prediction states stored.

Hence, a branch predictor which predicts the taken or not-taken outcome for a given branch instruction based on an opcode-indexed table which is indexed based on at least one property of a given branch which includes information derived from the opcode of the given branch instruction, can be useful in a range of different branch predictors as a way of providing a reasonable level of prediction performance at very low cost. Hence, such an opcode-indexed table could also be used in branch predictors which do not support the static branch prediction mode, but use a dynamic branch prediction mode where branch prediction state continues to be trained based on actual branch outcomes once the device is operational.

In particular, if the opcode-indexed table is indexed based on properties which are independent of the instruction address, then this may provide very low overhead. For example in one implementation the inventor found that a small predictor using around 160 bits of branch prediction state, indexed based on the combination of opcode and whether the branch offset is positive or negative, could outperform a more complex predictor using around 3500 bits on some automotive benchmarks.

In some implementations, the opcode-indexed table could be the only branch prediction state used to determine the branch outcome to be predicted. However in other cases this may be included as one of a number of tables of branch prediction state information used to derive the branch prediction.

For example, in some cases the opcode-indexed table could be used as part of a more complex predictor alongside other branch prediction tables which are indexed based on information derived from at least one of: an instruction address of the given branch, and a history of previous branch outcomes for previously executed branches. For example the opcode-indexed table discussed above could be a component of a larger predictor such as a perceptron or TAGE predictor. Provision of a table which is opcode-indexed could be helpful for increasing accuracy of the larger perceptron or TAGE predictor, for example for acting as a fallback in case there are some branches for which the main prediction based on instruction address provides insufficient confidence.

Figure 1:
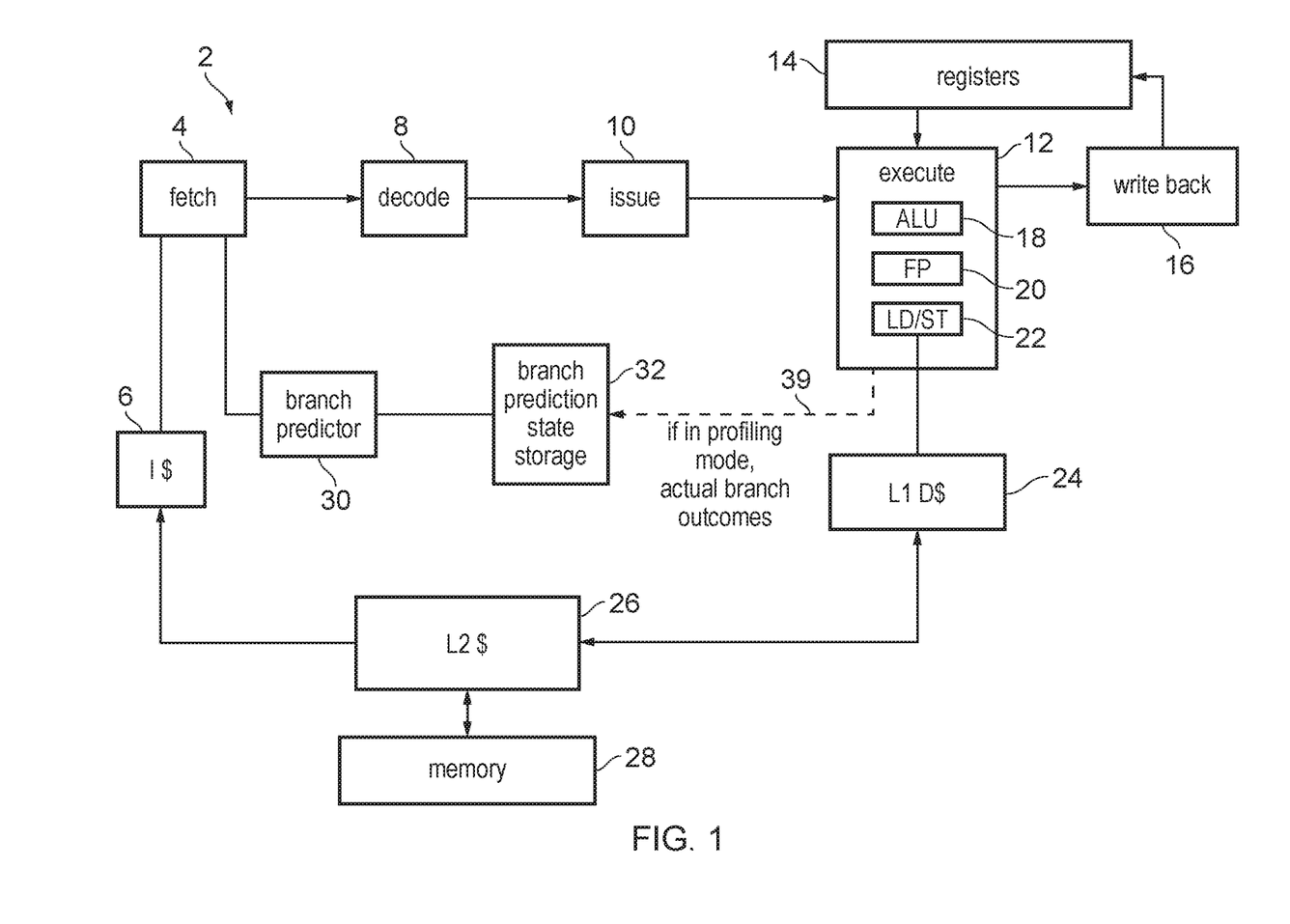
FIG. 1 schematically illustrates an example of a data processing system having a branch predictor.

FIG. 1 schematically illustrates an example of a data processing system 2. The system includes a processing pipeline which includes a number of pipeline stages including a fetch stage 4 for fetching program instructions from an instruction cache 6 or from a memory system, a decode stage 8 for decoding the fetched instructions, an issue stage 10 for checking whether operands required by the instructions are available and issuing the instructions for execution once the operands are available, an execute stage 12 for executing the instructions to perform data processing on operands read from registers 14 and generating processing results, and a writeback stage 16 for writing the processing results generated by the execute stage 12 back to the registers 14. The execute stage includes a number of execute units, including in this example an arithmetic/logic unit (ALU) 18 to perform arithmetic or logical operations, a floating point unit 20 for performing operations involving floating point numbers, and a load/store unit 22 for handling memory access operations, such as load instructions for loading data from a memory system into the registers 14 or store instructions for storing data from the registers 14 to the memory system. In this example the memory system includes the instruction cache 6, a level 1 data cache 24, a shared level 2 cache 26 used for data and instructions, and main memory 28. It will be appreciated that this is just one example of a possible memory hierarchy and other arrangements of caches or memories could be provided. Also, the particular arrangement of pipeline stages shown in FIG. 1 is just one example and other pipeline stages could be provided, such as a register renaming stage in an out of order processor.

The apparatus 2 has a branch predictor 30 for predicting outcomes of branch instructions to be executed by the pipeline. The predictions are based on branch prediction state information stored in branch prediction state storage 32. Based on the predictions made by the branch predictor 30, the fetch stage 4 fetches instructions for execution by the pipeline so that the instructions predicted to be needed to be executed following the branch are fetched before the outcome of the branch is actually known. A number of properties of the branch may be predicted by the branch predictor, for example the branch direction (taken or not taken) and the branch target address (address of the instruction to be executed next after the branch in the case when the branch is predicted to be taken). For the branch target address prediction, any known technique may be used. The examples below focus on the branch direction prediction.

Figure 2:
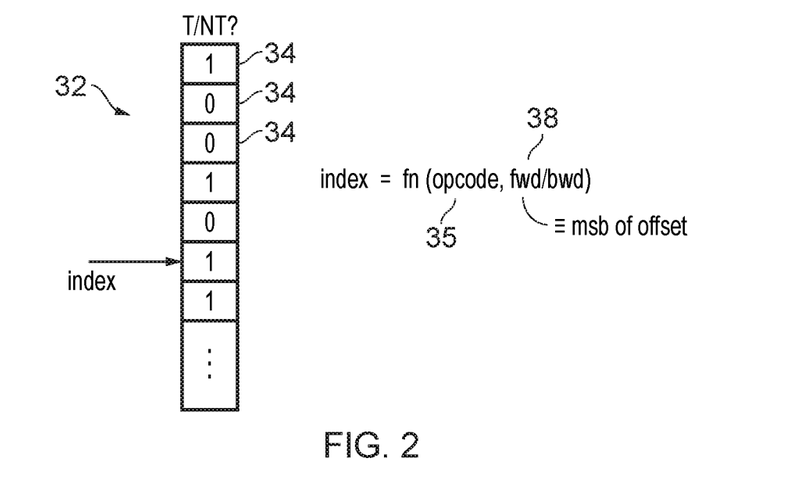
FIG. 2 shows a first example of programmable branch prediction state information.

FIG. 2 shows a first example of branch prediction state that may be stored by the branch prediction state storage 32. In this example the branch prediction state is an opcode-indexed branch prediction table which comprises a set of one-bit indicators 34, which are indexed based on an index value derived as a function of the opcode 35 of a branch instruction and an indication 38 of whether the branch instruction is a forward or backward branch. For example, the forward or backward branch indication 38 may be selected as the most significant bit of the branch offset for the branch, which if 0 will indicate a forward branch with a positive branch offset and if 1 will indicate a backward branch with a negative branch offset. By combining the opcode and the forward/backward branch indication 38 into the index, this effectively means the branch prediction state table 32 acts as a two-dimensional table of predictions of whether a branch is taken or not taken as follows:

| | forwards branch | backward branch |
|---|---|---|
| opcode A | 1 | 0 |
| opcode B | 0 | 0 |
| opcode C | 0 | 1 |
| opcode D | 1 | 1 |
| ... | ... | ... |

For example, a bit of 1 could represent a taken prediction and a bit of 0 could represent a not-taken prediction, or vice versa.

Note that this table is indexed independent of the instruction address of a branch so that all forwards branches with a given branch opcode may have the same taken or not taken prediction made for them regardless of where they appear in the program. Similarly all backwards branches of a given branch opcode may have the same prediction. Effectively this branch prediction table is an extension of a static branch prediction scheme which traditionally treats forward branches as not taken and backwards branches as taken, but makes this rule programmable per opcode so that whether the positive branch offset or negative branch offset is predicted taken or not taken can be configured separately for each opcode. That is, this example of the table comprises two bits per opcode: one bit that determines whether the static prediction is taken for positive offsets of the opcode and another bit that determines whether static prediction is taken for negative offsets of the opcode.

The values of these bits 34 may be programmable as discussed below, either in a profiling mode or by dedicated instructions for setting the values of each bit 34 based on code profiling.

Figure 3:
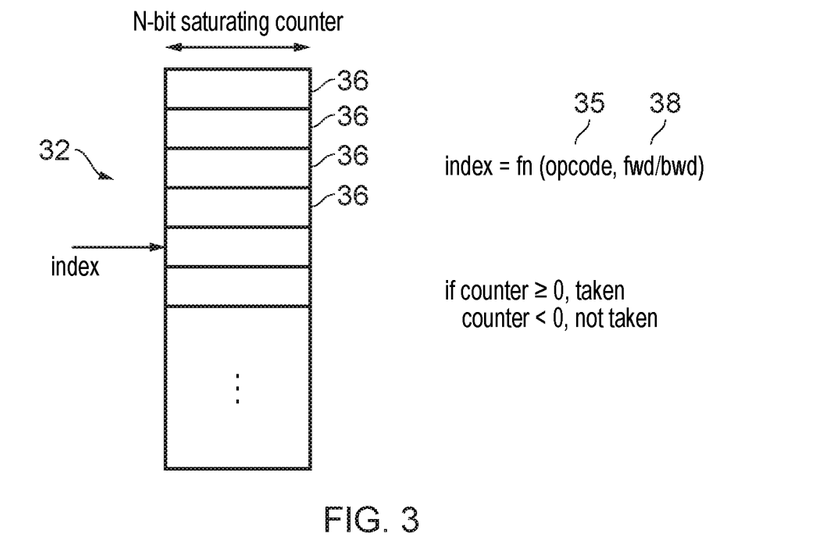
FIG. 3 shows a second example of programmable branch prediction state information.

FIG. 3 shows an alternative opcode-indexed table which uses the same index function as in FIG. 2, but this time each item of branch prediction state is an N-bit saturating counter 36, where N is 2 or greater. This approach can be useful for supporting a profiling mode as discussed below. With this approach, when the branch predictor 30 indexes into one of the items of branch prediction state 36 based on the opcode 35 and forwards/backwards branch indication 38, then if the counter is greater than or equal to some threshold (e.g. 0) then the branch may be predicted taken and if the counter is less than the threshold then the branch may be predicted not taken.

Figure 4:
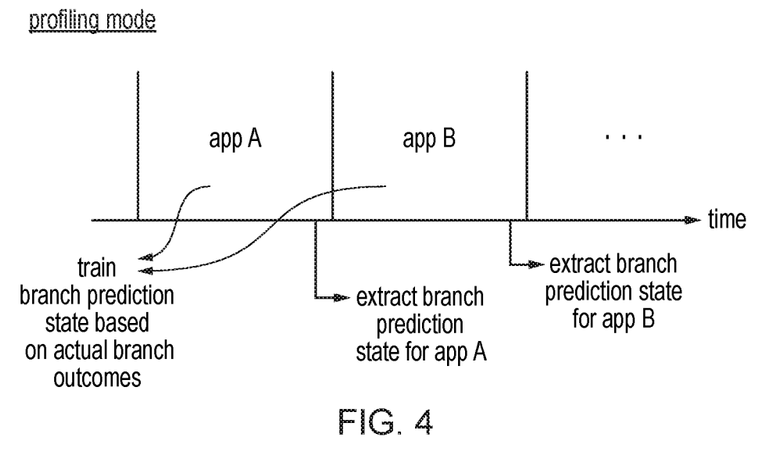
FIG. 4 schematically illustrates a profiling mode for training the branch prediction state information.

FIG. 4 schematically illustrates an example of the branch predictor 30 operating in a profiling mode. In the profiling mode, the branch predictor 30 trains the state stored in the branch prediction state storage 32 based on an indication of actual branch outcomes 39 provided by the execute stage 12 for executed branch instructions (see FIG. 1). For example if a branch instruction is determined to be taken at the execute stage 12, then the branch predictor 30 may increment the corresponding one of the saturating counters 36 to increase the likelihood that the taken prediction is made for that branch again. When the counter reaches its maximum positive value then it saturates and is not incremented again if the branch is resolved as taken once more. On the other hand if an executed branch is determined to be not taken then the corresponding counter is decremented, again saturating at the most negative value of the counter. In this way, as program code for a given application is executed, then the branch prediction state is trained based on its actual branch outcomes. As shown in FIG. 4, the trained values of the counter 36 can then be extracted after a period of running a given application and saved to the memory system so that they can be programmed into the branch prediction state storage 32 if the same application is executed again. This may be done separately for each application, for example FIG. 4 shows two applications A and B which each have sets of branch prediction state derived by training based on actual resolve branch outcomes and the branch prediction state for each application is saved to memory. For example the instruction used to extract the branch prediction state from the branch prediction state storage 32 could be an instruction for reading a system register or could be a load instruction for loading data from a memory mapped set of registers corresponding to the branch prediction state storage 32.

Figure 5:
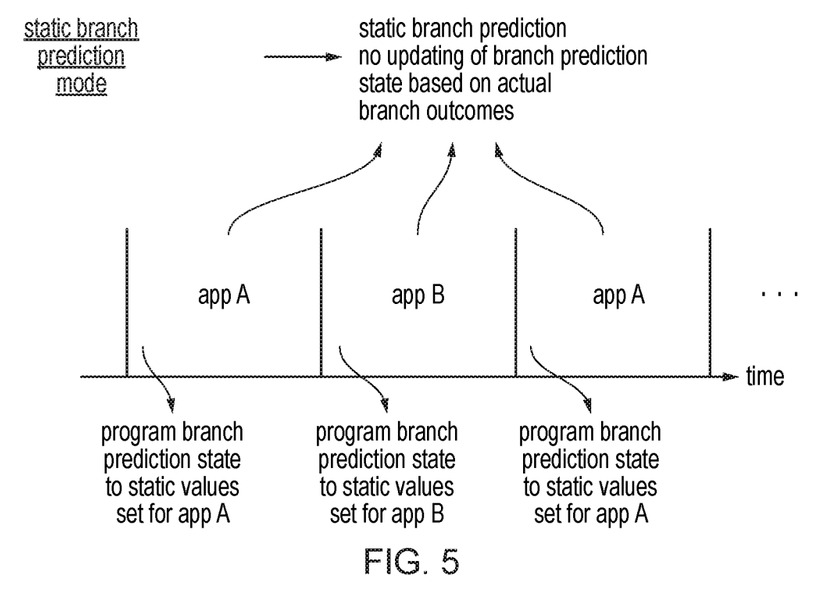
FIG. 5 schematically illustrates a static branch prediction mode in which predictions are made based on the branch prediction state information but the branch prediction state information is not updated in response to actual branch outcomes of executed branch instructions.

In contrast, FIG. 5 shows an example of a static branch prediction mode, in which there is no updating of branch state in the branch prediction state storage based on the actual outcomes 39 of the executed branches. With this approach, once in the static branch prediction mode, the values in the branch prediction state storage 32 are fixed. This could be based either on the example of FIG. 2 which does not support the profiling mode, and in this case the fixed values of the statically configured branch prediction state would have been determined earlier by code profiling by a developer developing a given piece of software. Alternatively the static values could be the values of the counters 36 in the example of FIG. 3 which were obtained by use of the profiling mode as shown in FIG. 4. During the static branch prediction mode, when a given application starts running, the operating system or another managing process which manages scheduling of the application may program the branch prediction state storage 32 with the appropriate set of branch prediction state values which were previously derived for that particular application. Hence on switching from application A to application B the operating system or other supervising software could reprogram the branch prediction state storage, loading in the previously set static values for the new application B. On switching back to application A then again the branch prediction state storage 32 may be reprogrammed again as shown in FIG. 5. However, once the program values have been set, during the static branch prediction mode no further updates of that branch prediction state are made based on the actual branch outcomes 39 determined by the execute stage 12 for the executed branches of that application. This can be very useful for safety-critical or real-time applications where the deterministic response latency is important when executing a given piece of software.

Hence, in summary a static branch predictor is provided that can be programmed based on code profiling to give the best performance while retaining deterministic behaviour. Code profiling can be performed by the device itself during software/system development, and then locked during normal operation in the field. Furthermore, in some examples the static prediction function can be tuned on a per-task basis.

In markets that care about determinism, static branch prediction may be employed because dynamic branch prediction introduces a lot of difficult-to-understand jitter in performance, which is the opposite of deterministic. A problem with static prediction is that is offers very poor prediction accuracy, which means less performance. Static prediction is normally inflexible, traditionally treating forwards branches (positive offset) as not taken and backward branches (negative offset) as taken. That static prediction function is: prediction(offset)=offset<0 ? TAKEN: NOT_TAKEN. This uses a single variable: the branch target offset.

In contrast, in the examples of FIGS. 2 and 3 above, the number of variables used to make the static prediction is expanded, and the prediction function is made programmable in hardware. For example, in a typical instruction set architecture there may be relatively few conditional branch opcodes, and it can be observed that the relationship between the sign of their offset and the typical taken-ness of the branches may be different for different opcodes. Some opcodes are normally taken with positive offsets and not taken with negative offsets, while other opcodes show the opposite behaviour. Some opcodes are normally taken or not taken regardless of their offset. The static prediction function above therefore does not fit well with many branch types. By expanding static prediction to consider the opcode as well as the offset, better performance can be achieved.

In one example, this can be made programmable using two bits per opcode: one bit that determines whether the static prediction is taken for positive offsets of the opcode, and another bit that determines whether static prediction is taken for negative offsets. To determine the best values for these bits, the code can be profiled. The programmable prediction table is effectively a two-dimensional array indexed by an opcode type and a bit indicating whether the offset is positive or negative. The table stores bits, indicating whether the prediction is taken or not taken: bit prediction_table[opcode][bit].

The static prediction function then becomes: prediction (offset, opcode, prediction_table[ ][ ])=prediction_table[opcode][offset<0].

If the prediction table is fixed, this is deterministic static prediction.

A further extension may be that instead of using two bits per opcode in the prediction table, two N-bit saturating counters could be used per opcode as shown in FIG. 3. One counter deals with positive offsets and the other deals with negative offsets. These counters are stored in registers that are programmable by privileged software, and an additional programmable register controls whether the system is in profiling mode or deterministic mode. The prediction table is now defined as: bit[N−1:0] prediction_table[opcode][bit]

When writing system software that needs to be deterministic, the developer runs the software in profiling mode. In this mode, the processor automatically increments and decrements each counter in the prediction table according to the following algorithm:

1. At reset, all counters are zero.
2. When a branch is known to be taken, the counter for its opcode and offset sign (i.e. prediction_table[opcode][offset<0]) is incremented (saturating) by the processor hardware.
3. When a branch is resolved as not taken, the counter for its opcode and offset sign is decremented (saturating) by the processor hardware.
4. When a prediction is made, the prediction is based on whether the counter indexed for the required opcode and offset is above or below a threshold (e.g. if the threshold is zero the prediction can be based on the most significant bit of the indexed counter).

In profiling mode, because the counters vary during execution of the program, the predictor is no longer static. However at the end of the program the counters will have reached values approximating the average behaviour of branches for that program, provided the counters are sufficiently wide. The developer can read back these prediction_table[ ][ ] values to determine the best fixed values to use when the software is run in the field in deterministic mode. This can be repeated on a per-application basis, as different applications might display different typical branch behaviours.

Having the mechanism to obtain preferred parameters for the static prediction function on a per-task basis, the system can automatically program the static predictor to the preferred branch state on a per-task basis when the device is being run in the field. This can be achieved by encoding the preferred prediction table values for a given application (as determined by running in profiling mode) into the software, which could be done using literal pools at the start of the image, or by encoding it into the source code in some other way.

The operating system can now be programmed so that it runs in deterministic (static branch prediction) mode. In deterministic mode, the processor will NOT automatically increment/decrement the prediction_table[ ][ ] counters. Only privileged software will be able to modify the prediction table through explicit writes. However, in deterministic mode, the static prediction function is the same as the last definition. In deterministic mode, upon starting a new task the OS can write prediction_table[ ][ ] with the optimal values for the task as obtained from the task image. This way, the static prediction function for each individual task will use the parameters that have been determined to be the optimal values for that task.

This offers much greater flexibility and much better performance than a one-size-fits-all static prediction function.

Note that when running in profiling mode, the predictor is effectively a very lightweight dynamic predictor. There are also applications where it can be used in a dynamic prediction context. The predictor as described can be very small, e.g. using as few as 160 bits in one example using 4-bit counters. When used effectively as a dynamic predictor, for some automotive benchmarks this can actually outperform a much more complex predictor that uses many more bits. Therefore, it is also possible to use this dynamic predictor as a component of a larger predictor to increase its accuracy.

Figure 6:
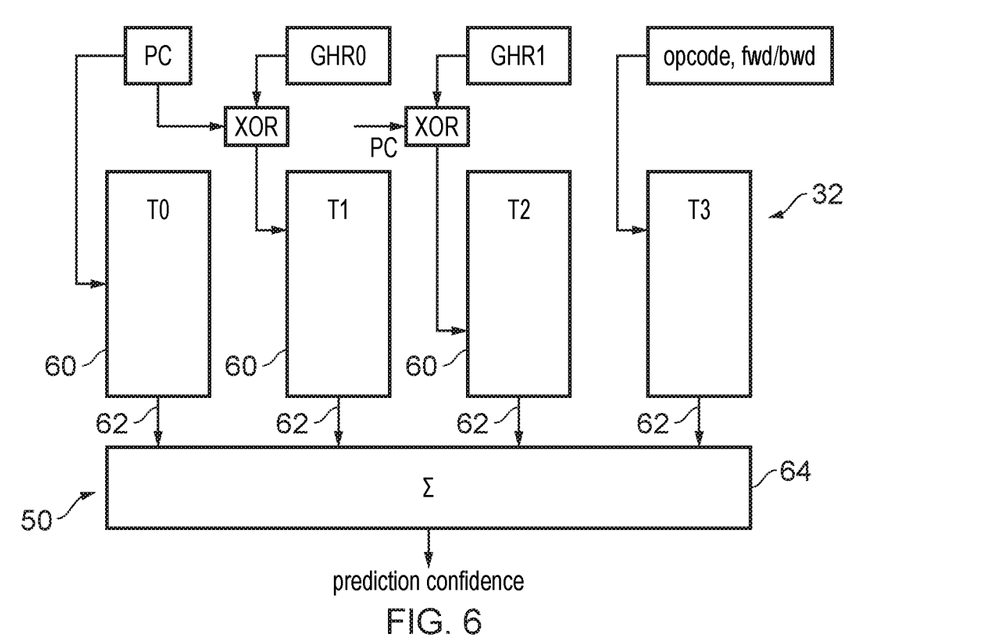
FIG. 6 shows an example of a perceptron branch predictor which uses as one of its prediction tables a table indexed based on the opcode of a branch instruction.

Hence, the opcode-indexed table 32 shown in the examples of FIG. 2 or 3 could also be used as part of a larger predictor which uses dynamic branch prediction. FIG. 6 shows an example where the opcode-indexed table is one of a number of prediction tables 60 provided within a perceptron predictor 50. In a perceptron predictor each of the tables 60, 32 is indexed based on some property of the branch to be predicted or of behaviour of the program being executed. For example, in FIG. 6 table T0 is indexed based on the program counter which indicates the instruction address of the current instruction being predicted, and tables T1 and T2 are indexed based on the combination of the program counter with respective portions GHR0, GHR1 of a global history register which tracks the taken/not-taken outcomes of the most recent X branches (where X some integer). Here the global history register (GHR) tracks the taken or not-taken outcomes of the most recently seen branches within the program, where those branches are branches at any instruction address, not the most recent X instances of executing the branch associated with the current program counter. It will be appreciated that prediction tables T0 to T2 are just one example of how tables for a perceptron could be defined. The opcode-indexed table 32 is provided as a fourth prediction table T3 alongside the other prediction tables T0 to T2. Each of the tables provides a set of confidence values which are indexed based on the corresponding property (program counter, GHR0 combined with program counter, GHR1 combined with program counter, or opcode 35 combined with forwards/backwards branch indication 38). These confidence values are learnt from the outcomes of resolved branches executed at the execute stage 12 during a processing of code in a dynamic branch prediction mode. The confidence values 62 output by each table for the given index are added together by adding circuitry 64 to provide the overall prediction confidence for the current branch. The prediction confidence for the current branch can then be compared with a threshold and if it is greater than the threshold then the branch may be predicted taken and if less than the threshold the branch may be predicted not taken. Hence, the opcode-index table 32 can be used as part of a component of a larger perceptron predictor to increase its accuracy.

Figure 7:
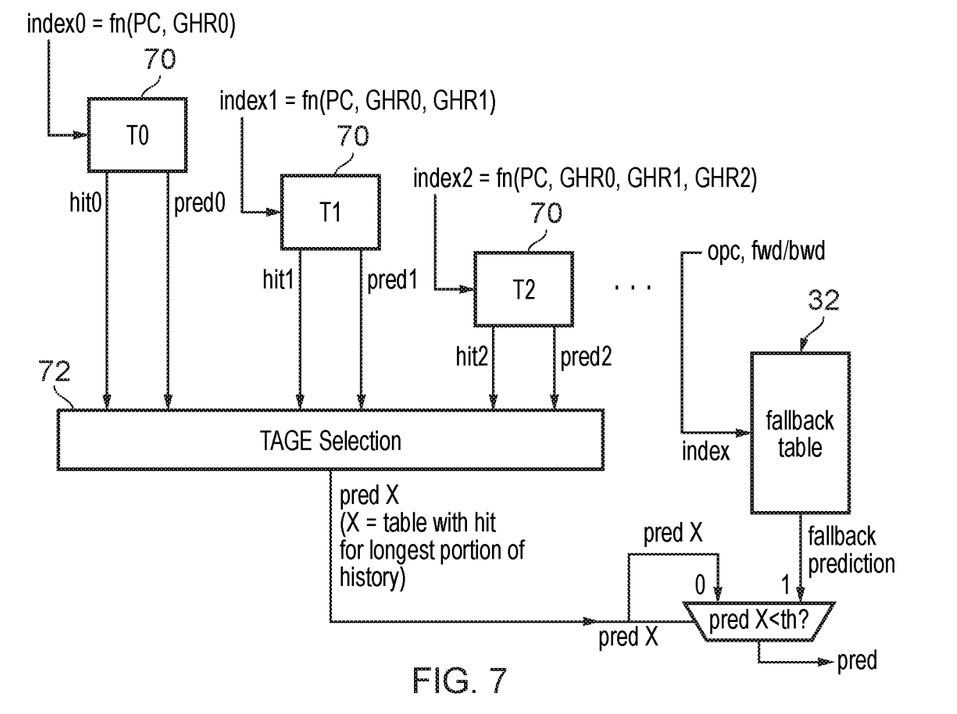
FIG. 7 shows an example of a TAGE branch predictor which uses as one of its prediction tables a table index based on the opcode of a branch instruction.

FIG. 7 shows a second example of a TAGE branch predictor where the opcode-indexed table 32 of FIG. 2 or 3 is used as a fallback prediction table to supplement the predictions made by a number of TAGE prediction tables 70. In this example the TAGE branch predictor uses a set of prediction tables 70 which provide prediction confidences which are selected based on an index derived as a function of the program counter indicating the instruction address of the branch to be predicted and a portion of the global history register (GHR) discussed above. Each of the TAGE tables 70 uses successively greater lengths of history information from the GHR, for example table T0 indexes into the table based on the combination of the program counter with a first portion GHR 0 of the history (the portion corresponding to the most recent branch history). Table T1 is indexed based on the combination of the program counter, history portion GHR 0, and a further portion GHR 1 of the global history register corresponding to less recent branches than GHR 0, and table T2 is indexed based on an even longer history considering an additional portion GHR 2 of the global history register in addition to GHR 0 and GHR 1 used for the table T1. The TAGE predictor has a selector 72 which selects between the predictions made by the respective TAGE tables so that whichever table generates a hit for the longest sequence of history from the global history register will have its prediction output as the overall prediction from the TAGE tables. For example, if the only table that generates a hit is T0 then the prediction made by T0 is selected by the selector 72. However, if table T1 generates a hit then its prediction would be selected in preference to the prediction of table T0, because it is more likely it will be accurate as it has considered a longer length of branch history. Hence, the TAGE approach allows a trade off between increased prediction accuracy and increased hit rate, but sometimes none of the TAGE tables may generate a hit and in this case the fallback prediction made by the fallback table 32 may be used. The opcode-indexed table 32 described above could be a relatively low cost way of providing the fallback prediction that could be used when the TAGE tables do not generate sufficient confidence.

Of course the predictors of FIGS. 6 and 7 are just some examples, and in general any branch predictor 30 could include the opcode-indexed table 32 as a component of the branch predictor. In some cases such a branch predictor may use a dynamic prediction mode where the prediction state of the opcode in table 32 continues to be trained based on the outcomes of execute branch instructions. However, in other examples as shown in FIG. 5 the predictor may use a static branch prediction mode to provide determinism so that once the values of the opcode-indexed table are fixed by programming, then there are no subsequent updates of that prediction state based on actual branch outcomes, to ensure deterministic response times.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to instructions; and
a branch predictor to predict a branch outcome for a given branch instruction as one of taken and not-taken, based on branch prediction state information stored in branch prediction state storage circuitry and indexed based on at least one property of the given branch instruction; in which:
in a static branch prediction mode of operation, the branch predictor is configured to predict the branch outcome based on static values of the branch prediction state information stored in the branch prediction state storage circuitry, and the static values of the branch prediction state information stored in the branch prediction state storage circuitry are programmable values set independent of actual branch outcomes of branch instructions which are executed by the processing circuitry while in the static branch prediction mode; in which the processing circuitry is configured to program at least a subset of the branch prediction state information in response to a branch prediction state programming instruction executed by the processing circuitry; and
at least one of:
the branch prediction state programming instruction comprises one of: a system register updating instruction; and a store instruction specifying, as a target address, an address mapped to a register storing said at least a subset of the branch prediction state information;
and
the processing circuitry is configured to execute instructions at one of a plurality of privilege levels, and the processing circuitry is configured to trigger an exception when the branch prediction state programming instruction is executed at a privilege level which is less privileged than a threshold privilege level.

2. The apparatus according to claim 1, in which in a profiling mode of operation, the branch predictor is configured to train the branch prediction state information based on actual branch outcomes of branch instructions which are executed while in the profiling mode.

3. The apparatus according to claim 2, in which the branch prediction state information comprises a set of saturating counters indexed based on said at least one property of the given branch instruction.

4. The apparatus according to claim 2, in which the processing circuitry is configured to extract a current value of at least a subset of the branch prediction state information trained during the profiling mode, in response to a branch prediction state extracting instruction executed by the processing circuitry.

5. The apparatus according to claim 4, in which the branch prediction state extracting instruction comprises one of:
a system register read instruction; and
a load instruction specifying, as a target address, an address mapped to a register storing said at least a subset of the branch prediction state information.

6. The apparatus according to claim 4, in which the processing circuitry is configured to execute instructions at one of a plurality of privilege levels, and the processing circuitry is configured to trigger an exception when the branch prediction state extracting instruction is executed at a privilege level which is less privileged than a threshold privilege level.

7. The apparatus according to claim 1, in which said at least one property of the given branch instruction comprises information derived from an opcode of the given branch instruction.

8. The apparatus according to claim 1, in which said at least one property of the given branch instruction comprises an indication of whether the given branch instruction is a forwards branch or a backwards branch.

9. The apparatus according to claim 1, in which said at least one property of the given branch instruction comprises information indicative of a size of a branch offset for the given branch instruction.

10. The apparatus according to claim 1, in which said at least one property is independent of an instruction address of the given branch instruction.

11. A branch prediction method for a data processing apparatus comprising:
predicting a branch outcome for a given branch instruction as one of taken and not-taken, based on branch prediction state information stored in branch prediction state storage circuitry and indexed based on at least one property of the given branch instruction; in which:
in a static branch prediction mode of operation, the branch outcome is predicted based on static values of the branch prediction state information stored in the branch prediction state storage circuitry, and the static values of the branch prediction state information are programmable values set independent of actual branch outcomes of branch instructions which are executed while in the static branch prediction mode;
in which at least a subset of the branch prediction state information is programmable in response to a branch prediction state programming instruction executed by processing circuitry; and
at least one of:
the branch prediction state programming instruction comprises one of: a system register updating instruction; and a store instruction specifying, as a target address, an address mapped to a register storing said at least a subset of the branch prediction state information;
and
the processing circuitry is configured to execute instructions at one of a plurality of privilege levels, and the processing circuitry is configured to trigger an exception when the branch prediction state programming instruction is executed at a privilege level which is less privileged than a threshold privilege level.

12. The apparatus according to claim 1, in which:
the branch predictor is configured to predict a branch outcome for a given branch instruction as one of taken and not-taken, based on an opcode-indexed table of branch prediction state information indexed based on said at least one property of the given branch instruction, in which:
said at least one property comprises information derived from an opcode of the given branch instruction.

13. The apparatus according to claim 12, in which said at least one property is independent of an instruction address of the given branch instruction.

14. The apparatus according to claim 12, in which said at least one property also comprises an indication of whether the given branch instruction is a forwards branch or a backwards branch.

15. The apparatus according to claim 12, in which the branch predictor is configured to predict the branch outcome based on a plurality of tables of branch prediction state information, including said opcode-indexed table and at least one further table indexed based on information derived from at least one of: an instruction address of the given branch instruction, and a history of previous branch outcomes for previously executed branches.

16. The apparatus according to claim 12, in which the branch predictor is configured to train the opcode-indexed table based on actual branch outcomes of branch instructions which are executed while in a dynamic branch prediction mode.

17. The apparatus according to claim 13, in which the branch predictor is configured to predict the branch outcome based on static values of the opcode-indexed table set independent of actual branch outcomes of branch instructions which are executed while in a static branch prediction mode.

* * * * *